Patented Dec. 15, 1953

2,662,904

UNITED STATES PATENT OFFICE 2,662,904

PREPARATION OF 17α-HYDROXY STEROIDS

Percy L. Julian, Maywood, and Edwin W. Meyer and Isabelle Ryden, Chicago, Ill., assignors to The Glidden Company, Cleveland, Ohio, a corporation of Ohio No Drawing. Application May 16, 1949, Serial No. 93,638

7 Claims. (Cl. 260—397.5)

The present invention relates to the production of 17α-hydroxy steroids.

Many of the corticohormones possess a 17α-hydroxy group. These hormones are at present commercially prepared by tedious and expensive extraction and purification methods from adrenal cortices. Synthetic methods for introducing the 17α-hydroxy group into steroid materials obtainable from other natural sources have been proposed, Fuchs and Reichstein, Helv. Chem. Acta, 24, 804, (1941); Hegner and Reichstein, Helv. Chem. Acta, 24, 828, 1941, but these have either been exceedingly complex because of the multitude of steps, or have involved the use of expensive and hazardous chemicals, such as osmium tetroxide, Sarett, J. Biol. Chem. 162, 601, 1946; Sarett, J. A. C. S., 70, 1454, (1948).

It is accordingly an object of the present invention to provide a novel method for introducing a 17α-hydroxy group into the steroid molecule.

Another object is to produce new intermediates valuable in the synthesis of steroids possessing cortical activity.

Other objects will be apparent from the following description.

It appeared that reduction of 16,17-oxido-pregnene and pregnane compounds might lead to the introduction of the 17α-hydroxy group. However, the usual reducing treatments were found to be unsuitable.

It has now been found, however, that the desired compounds are readily produced when the 16,17-oxido-compounds are reduced with lithium aluminum hydride, LiAlH₄.

The reaction may be represented by the following general equation

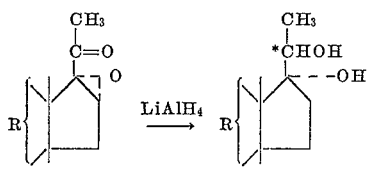

where "R" represents the rest of the polyhydrocyclopentanophenanthrene nucleus and the asterisk indicates the C-20 epimeric configurations.

The following examples are illustrative.

EXAMPLE 1

*Preparation of 16,17-oxido-5-pregnene-3β-ol-20-one acetate*

A solution of 3.54 grams of Δ⁵,¹⁶-pregnadiene-3β-ol-20-one acetate in 20 ml. of CHCl₃ was treated at ice bath temperature with a solution of 1.60 g. of bromine in 16 ml. of CHCl₃. The chloroform solution was then washed with water, 2% NaOH, water and dried. It was then concentrated in vacuo to a white crystalline solid. This solid was dissolved in 50 ml. of benzene and treated with 50 ml. of a benzene solution containing 56 mg. of perbenzoic acid per ml. After standing in the dark room at room temperature for 24 hours, the benzene solution was washed with 2% NaOH solution and water. The dried solution was concentrated to a white crystalline solid which was debrominated with zinc dust in ether-acetic acid solution. The ether solution was separated from zinc, washed with water, dilute sodium bicarbonate solution, water and dried. After concentration, the product, Δ⁵-16,17-oxido-pregnene-3β-ol-20-one acetate, was crystallized from methanol; 1.66 g., M. P. 152–155° C.

EXAMPLE 2

*Reduction of 16,17-oxido-pregnenolone acetate*

A solution of 1.0 g. of the oxido-pregnenolone acetate of Example 1 in 50 ml. of anhydrous ether was added dropwise to a stirred suspension of 500 mg. of lithium aluminum hydride in 50 ml. of ether. The mixture was then stirred at room temperature for one-half hour and at reflux for one-half hour. The reaction mixture was decomposed by slow addition of water. The ether layer was washed with 2 N sulfuric acid, water, sodium bicarbonate solution, and water. The white crystalline product remaining after removal of solvent from the dried solution melted at 170–185° C. This material contains a mixture of the C-20 epimers of Δ⁵-pregnene-3β, 17α, 20-triol.

This material may be used directly for the preparation of 17α-hydroxy progesterone. By bromination in methylene chloride, removal of solvent in vacuo and then oxidation in acetic acid with chromic acid, followed by removal of bromine with chromous chloride there resulted a crude reaction product. By fractional crystallization and chromatography, the desired 17α-hydroxy progesterone was isolated from this product.

EXAMPLE 3

The nature of the mixture obtained according to Example 2 was determined by oxidation with periodic acid. The product from 500 mg. of the oxide was oxidized with 833 mg. of periodic acid in acidulated aqueous methanol. After 24 hours at room temperature, the mixture was neutralized and distilled in vacuo. From the distillate there was obtained acetaldehyde as the 2,4 dinitrophenylhydrazone, 50 mg. or orange plates, M. P. 164–167° C., which gave no depression in melting point when mixed with authentic material.

The residue from the distillation was diluted with water and extracted with ether. The extract was then washed with dilute HCl, water, dilute NaOH solution and water. After removal of ether from the dried solution, there remained an orange gum which was chromatographed on 15 g. of activated alumina. From the benzene-ether eluates there was obtained 10 mg. of crude dehydroisoandrosterone, M. P. 138° C., after losing solvent at 100° C. Crystallization from methanol gave white needles melting at 148–149° C., which showed no depression in melting when mixed with authentic dehydroisoandrosterone.

EXAMPLE 4

$\Delta^{16}$-allopregnene-3$\beta$-ol-20-one acetate oxidized with perbenzoic acid and the reaction product worked up as in Example 1 yields 16,17-oxido-allopregnane-3$\beta$-ol-20-one acetate. This can then be reduced with LiAlH$_4$ and the reaction product decomposed with water as in Example 2. Working up the product as in Example 2 yields a mixture of the 20-epimeric allopregnane 3$\beta$-17$a$-20-triol (corticosteroids J and O).

EXAMPLE 5

*Preparation of $\Delta^5$-pregnene-3$\beta$,17$a$,20-triols from the 3-hydroxy-oxido compound*

The 16,17-oxido-5-pregnene-3$\beta$-ol-20-one acetate produced in Example 1 was hydrolyzed to form the 3-hydroxy compound which was then treated with lithium aluminum hydride as in Example 2. The reaction product was then decomposed with water and the reaction product worked up as in Example 2 to give a mixture containing the same C-20 epimers as were produced in Example 2.

The foregoing examples will serve as illustrative of the type of steroid compounds which can be employed. The compounds may be defined as being 16,17-oxido-pregnanes and pregnenes, which may be substituted or not in various positions in the nucleus. Thus, compounds containing substituents in the 6, 7, 11, 12, or other positions of the nucleus may also be employed, in addition to those having a substituent only at the 3 position. Also, 16,17-oxido compounds containing unesterified —OH groups may be reduced according to the invention.

Reference is made to our application Serial No. 109,808, filed August 11, 1949, wherein the $\Delta^5$-16,17-oxido steroids, disclosed herein, and their preparation are claimed.

Having described the invention, what is claimed is:

1. The process which comprises reducing a nuclearly unsaturated 17-acetyl-16,17-oxido-steroid with lithium aluminum hydride.

2. The process which comprises reducing a nuclearly unsaturated 17-acetyl-16,17-oxido-steroid with lithium aluminum hydride and decomposing the resulting product with an aqueous medium.

3. The process which comprises reducing a nuclearly unsaturated 17-acetyl-16,17-oxido-3$\beta$-hydroxy steroid with lithium aluminum hydride.

4. The process which comprises reducing 16,17-oxido - 5 - pregnene-3$\beta$-ol-20-one with lithium aluminum hydride.

5. The process which comprises reducing 16,17-oxido - 5 - pregnene-3$\beta$-ol-20-one with lithium aluminum hydride and then decomposing the reaction product by treatment with an aqueous medium to form a mixture containing C-20 epimeric 5-pregnene 3$\beta$,17$a$,20-triols.

6. The process which comprises reducing 16,17-oxido-5-pregnene 3$\beta$-ol-20-one acetate with lithium aluminum hydride.

7. The process which comprises reducing 16,17-oxido-5-pregnene-3$\beta$-ol-20-one acetate with lithium aluminum hydride and then decomposing the reaction product by treatment with an aqueous medium to form a mixture containing C-20 epimeric 5-pregnene 3$\beta$,17$a$,20-triols.

PERCY L. JULIAN.
EDWIN W. MEYER.
ISABELLE RYDEN.

References Cited in the file of this patent

UNITED STATES PATENTS

| Number | Name | Date |
| --- | --- | --- |
| 2,368,199 | Butenandt | Jan. 30, 1945 |
| 2,372,440 | Logemann | Mar. 27, 1945 |

OTHER REFERENCES

Nystrom: Jour. Am. Chem. Soc., 69, 1197–1199.

Plattner et al.: Helv. Chim. Acta, vol. 31, pp. 1885–1890, 2210–2214 (1948); vol. 32, pp. 265–269, 587–591 (1949).

Fieser et al.: Natural Products Related to Phenanthrene, 3rd edition, pp. 410–411 (1949).